United States Patent [19]

Imamura et al.

[11] Patent Number: 5,967,927
[45] Date of Patent: Oct. 19, 1999

[54] CONTINUOUSLY VARIABLE TRANSMISSION FOR USE ON VEHICLE

[75] Inventors: Masahiro Imamura; Toru Takahashi, both of Utsunomiya, Japan

[73] Assignee: Honda Giken Kogyo Kabushiki Kaisha, Tokyo, Japan

[21] Appl. No.: 09/083,573

[22] Filed: May 22, 1998

[30] Foreign Application Priority Data

May 27, 1997 [JP] Japan ..................................... 9-137026

[51] Int. Cl.$^6$ ................................................. F16H 39/04
[52] U.S. Cl. ............................... 475/83; 475/72; 475/73; 74/606 R; 180/307
[58] Field of Search .................................. 475/72, 73, 83, 475/78, 80, 82; 174/606 R; 180/307

[56] References Cited

U.S. PATENT DOCUMENTS

| | | | |
|---|---|---|---|
| 2,296,929 | 9/1942 | Ifield .......................................... | 475/72 |
| 3,463,034 | 8/1969 | Miller ......................................... | 475/83 |
| 3,915,030 | 10/1975 | Ritter ......................................... | 475/83 |
| 4,373,408 | 2/1983 | Mills .......................................... | 475/72 |
| 5,030,177 | 7/1991 | Reed ..................................... | 475/72 X |
| 5,201,691 | 4/1993 | Doyle .................................... | 475/72 X |
| 5,230,519 | 7/1993 | Nishimura et al. ........................ | 475/83 |
| 5,782,142 | 7/1998 | Abend et al. .......................... | 74/606 R |
| 5,785,623 | 7/1998 | Iino et al. ................................... | 475/72 |
| 5,803,856 | 9/1998 | Iino et al. ................................... | 475/72 |
| 5,807,199 | 9/1998 | Keller ........................................ | 475/72 |

FOREIGN PATENT DOCUMENTS 7-280063 10/1995 Japan .
8-74965 3/1996 Japan .

OTHER PUBLICATIONS

English language Abstract of JP 7-280063.
English language Abstract of JP 8-74965.

*Primary Examiner*—Dirk Wright
*Assistant Examiner*—Peter T. Kwon
*Attorney, Agent, or Firm*—Lyon & Lyon LLP

[57] ABSTRACT

A continuously variable transmission for use on vehicle, which is provided in an FR drive power transmission path to change the rotational drive power of the engine in continuous speed variation, comprises a variable displacement type hydraulic swash plate pump (P) and a hydraulic swash plate motor (M), which are connected with each other through a hydraulic closed circuit (51). The hydraulic pump (P), which is driven by the engine, delivers oil to the hydraulic motor (M), and the hydraulic motor (M), which is driven by the oil being received, transmits the rotational drive power to the rear wheels. The hydraulic pump (P), the hydraulic closed circuit (51) and the hydraulic motor (M) are arranged in this order in series in a rearward direction from the output shaft of the engine in the vehicle, and hydraulic servo mechanisms (45) and (65) that swivel the swash plates of the hydraulic pump (P) and the hydraulic motor (M) and hydraulic control valves (V) that perform various hydraulic control operations are placed under the hydraulic continuously variable transmission mechanism of the transmission.

31 Claims, 8 Drawing Sheets

CONTINUOUSLY VARIABLE TRANSMISSION FOR USE ON VEHICLE

FIELD OF THE INVENTION

The present invention relates generally to a hydraulic continuously variable transmission which comprises a swash plate type hydraulic pump and a hydraulic motor, and particularly to a hydraulic continuously variable transmission which can be used as a power transmission system on a vehicle having a configuration of front engine rear wheel drive (this type of vehicle is hereinafter referred to as "FR drive vehicle").

BACKGROUND OF THE INVENTION

Hydraulic continuously variable transmissions which comprise a swash plate type hydraulic pump and a hydraulic motor have been known. For example, Japanese Laid-Open Patent Publications No. H7(1995)-280063 and No. H8(1996)-74965 disclose such transmissions. The transmission disclosed in Japanese Laid-Open Patent Publication No. H7(1995)-280063 is a hydrostatic transmission which comprises a hydraulic pump with a variable swash plate and a hydraulic motor with a fixed swash plate. In this transmission, the hydraulic pump, which is driven by the engine to supply oil to the hydraulic motor for actuation, is connected with the hydraulic motor through a hydraulic closed circuit. In this construction, the hydraulic pump, the hydraulic closed circuit and the hydraulic motor are connected in series in this respective order.

On the other hand, the transmission disclosed in Japanese Laid-Open Patent Publication No. H8(1996)-74965 is a hydromechanical transmission which comprises a hydraulic pump with a variable swash plate, a hydraulic motor with a fixed swash plate, and a power distribution mechanism, which divides the output of the engine into two portions, one to drive the hydraulic pump and the other to drive the output shaft of the transmission. Here, the hydraulic pump driven by the engine supplies oil through a hydraulic closed circuit to the hydraulic motor for the actuation of the motor. In this construction, the hydraulic closed circuit is arranged or formed in a control block, and the hydraulic pump and the hydraulic motor are positioned on this control block above and below the control block.

In any FR drive vehicle, naturally, the engine is placed in the front part of the vehicle, and the output shaft of the engine is connected through a transmission to a propeller shaft, which extends rearward through the central lower portion of the vehicle body. In this power transmission system, the rotational drive power of the engine taken out through the output shaft thereof is transmitted to the rear wheels of the vehicle through the propeller shaft. Generally, the transmission is provided at the rear end of the engine, extending rearward, so the drive power, which is received from the engine through the engine output shaft, is transmitted to the propeller shaft through the transmission, which changes the speed ratio. In the construction of this type of power transmission system, which is designed for FR drive vehicles, it is typical that the unit which includes the transmission and the propeller shaft is placed inside a floor tunnel which extends from the front part of the vehicle to the rear part in the cabin.

It is generally desired that the cabin space, i.e., the accommodation space available for the driver and other people riding the vehicle, be made as wide as possible to provide comfort. Also, there is a desire to improve the degree of freedom in laying out the cabin. Therefore, there is need to minimize the floor tunnel which protrudes or rises into the cabin, and there is a desire to form the floor tunnel in a straight line without ups and downs. Thus, the transmission, which is placed in the floor tunnel, is now required to have a configuration that can satisfy such need and desire.

SUMMARY OF THE INVENTION

It is an object of the present invention to provide a hydraulic continuously variable transmission which has a configuration that can meet the above mentioned requirement for use on vehicles of FR drive type.

The present invention relates to a continuously variable transmission which is provided in a power transmission path that transmits rotational drive power from the output shaft of a prime motor (e.g., an engine) placed in the front part of a vehicle to the rear wheels, i.e., in an FR drive power transmission path, to change the rotational drive power of the prime motor in continuous speed variation. This transmission is a so-called hydraulic continuously variable transmission and comprises a hydraulic swash plate pump and a hydraulic swash plate motor, which are connected with each other through a hydraulic closed circuit, and at least one of which is variable displacement type. In this transmission, the hydraulic pump, which is driven by the prime motor, delivers oil through the hydraulic closed circuit to the hydraulic motor, and the hydraulic motor, which is driven by the oil being received, transmits the rotational drive power to the rear wheels. Moreover, the hydraulic pump, the hydraulic closed circuit and the hydraulic motor, which are arranged in this order in series in the rearward direction from the output shaft of the prime motor in the vehicle, constitute a hydraulic continuously variable transmission mechanism, and a hydraulic servo mechanism that swivels the swash plates of the hydraulic pump and the hydraulic motor and a hydraulic control means that performs various hydraulic control operations are placed under the hydraulic continuously variable transmission mechanism.

In this configuration, as the hydraulic pump, the hydraulic closed circuit and the hydraulic motor, which constitute the hydraulic power transmission mechanism (i.e., the hydraulic continuously variable transmission mechanism), are aligned in series from the output shaft of the prime motor rearward in the vehicle, the transmission can be mounted compactly in the floor tunnel of the vehicle. Furthermore, as the hydraulic servo mechanism and the control means are arranged under the hydraulic continuously variable transmission mechanism, the height of the floor tunnel in the cabin can be made relatively small so as to provide more cabin space because there is no need to provide extra height to the floor tunnel for mounting the hydraulic servo mechanism and the control means. Moreover, as the hydraulic closed circuit is provided between the hydraulic pump and the hydraulic motor, the construction of the hydraulic control means is made relatively simple because the oil passages in high pressure are lead downward from the hydraulic closed circuit.

Preferably, the transmission be constructed in such an arrangement that the fulcrum shafts of the swash plates extend laterally and horizontally, and when the swash plate of the hydraulic pump is positioned at a maximum skew angle for forward drive, the lower end of the swash plate of the hydraulic pump is located forward from the fulcrum shaft thereof, and when the swash plate of the hydraulic motor is positioned at a maximum skew angle, the lower end of the swash plate of the hydraulic motor is located rearward from the fulcrum shaft thereof. In this construction, as the swash plates of the hydraulic pump and the hydraulic motor are positioned in a "\" configuration, the lower space of the hydraulic continuously variable transmission mechanism is made relatively wide to make it easy to mount the hydraulic servo mechanism and the hydraulic control means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
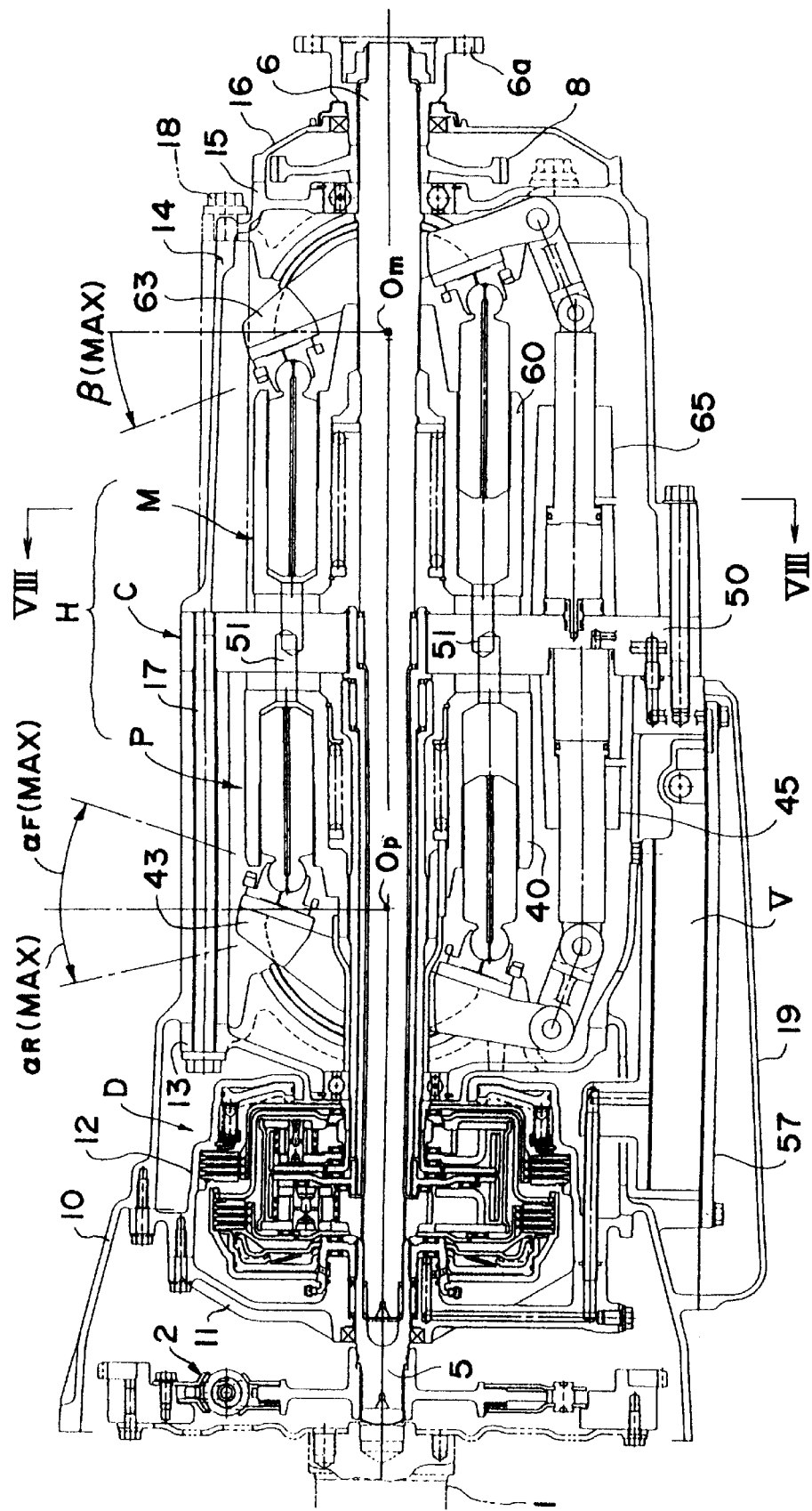
FIG. 1 is a sectional view of the whole construction of a continuously variable transmission according to the present invention.

With reference to the drawings, a preferred embodiment according to the present invention is described in the following. FIG. 1 shows the whole construction of a continuously variable transmission, which can be used on a vehicle, as a preferred embodiment of the present invention. The details of the construction are shown separately in FIGS. 2–4 in enlargement.

Construction of the Transmission

Figure 3:
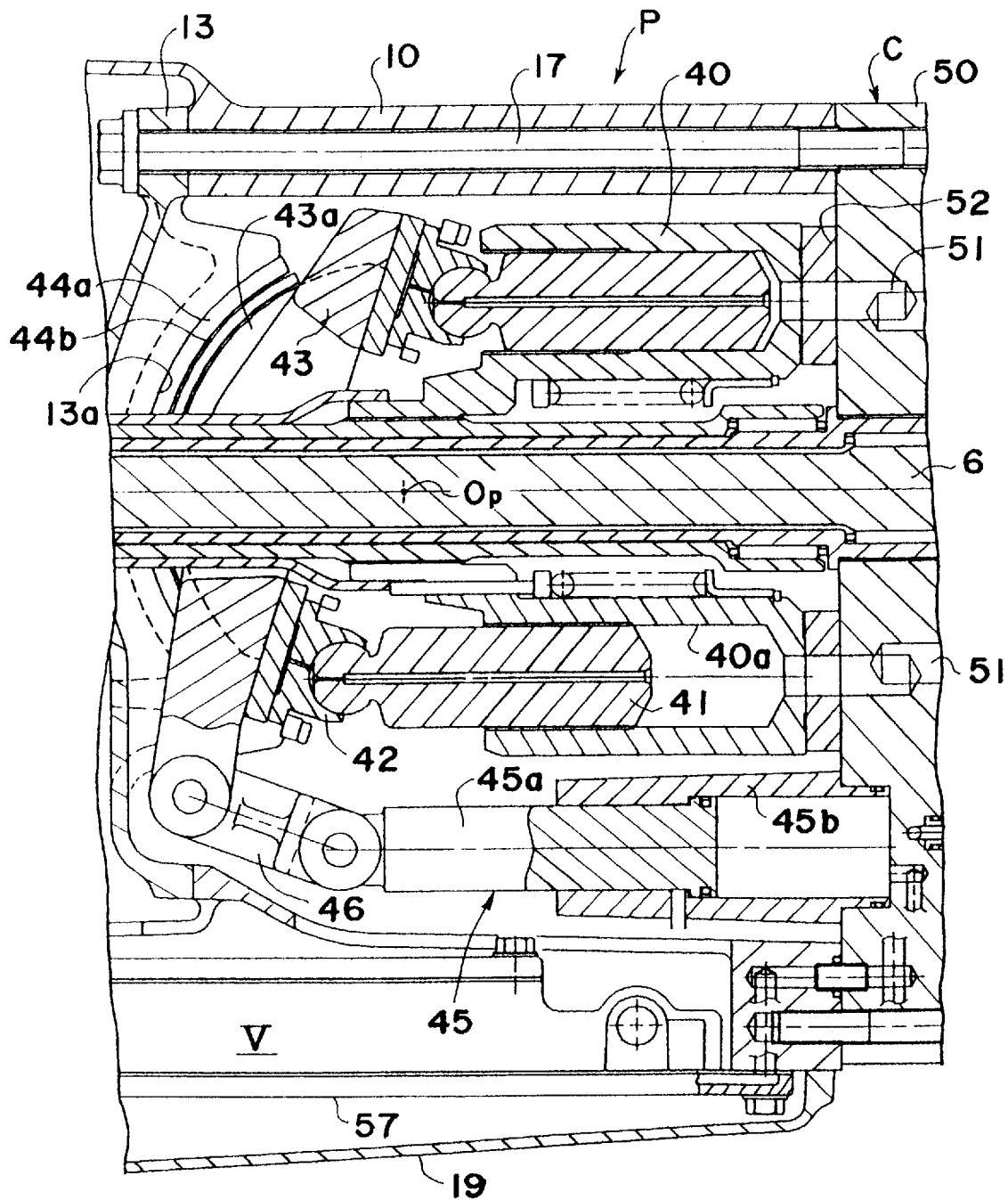
FIG. 3 is an enlarged sectional view of the central portion of the continuously variable transmission which is shown in FIG. 1.
Figure 4:
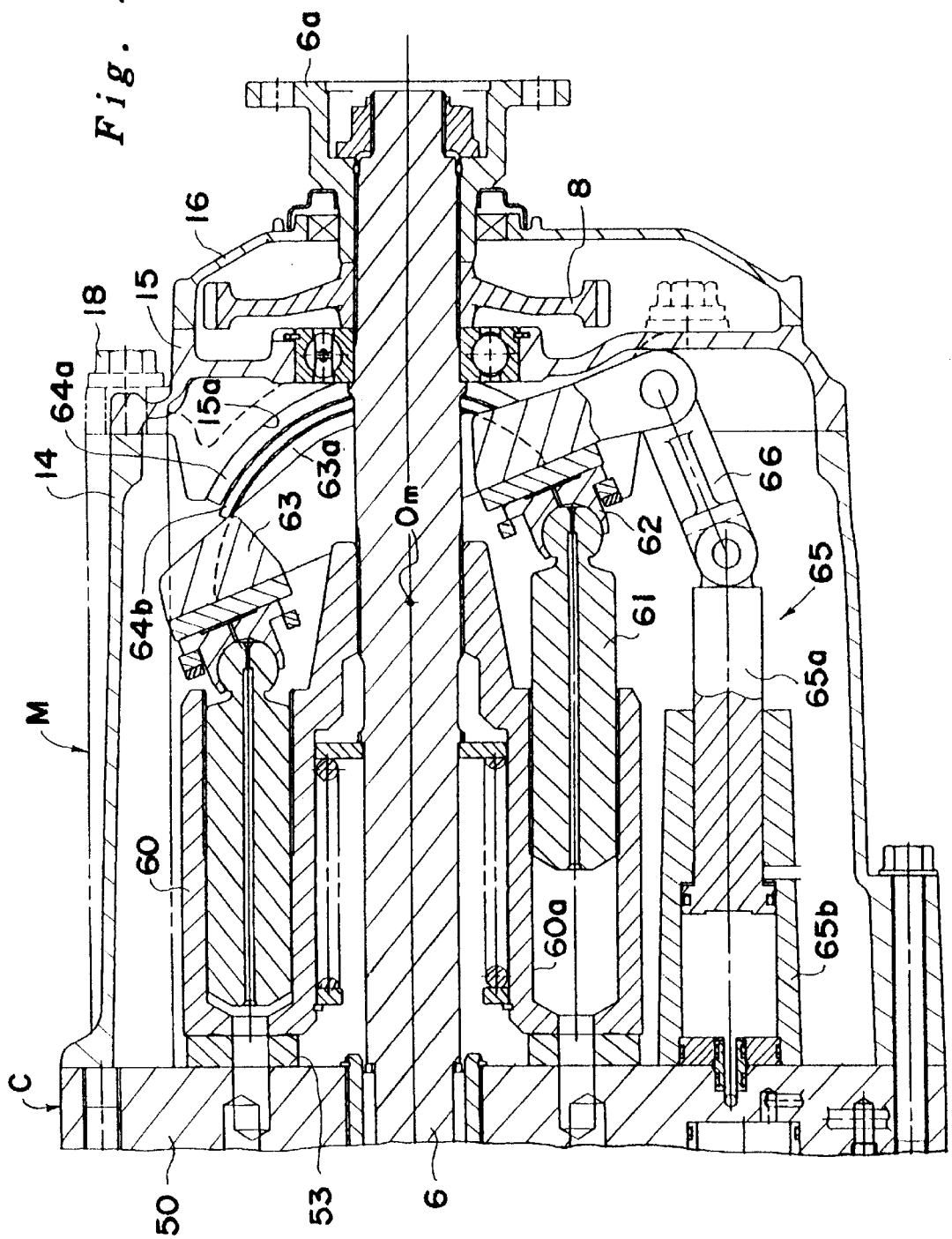
FIG. 4 is an enlarged sectional view of the right side portion of the continuously variable transmission which is shown in FIG. 1.
Figure 5:
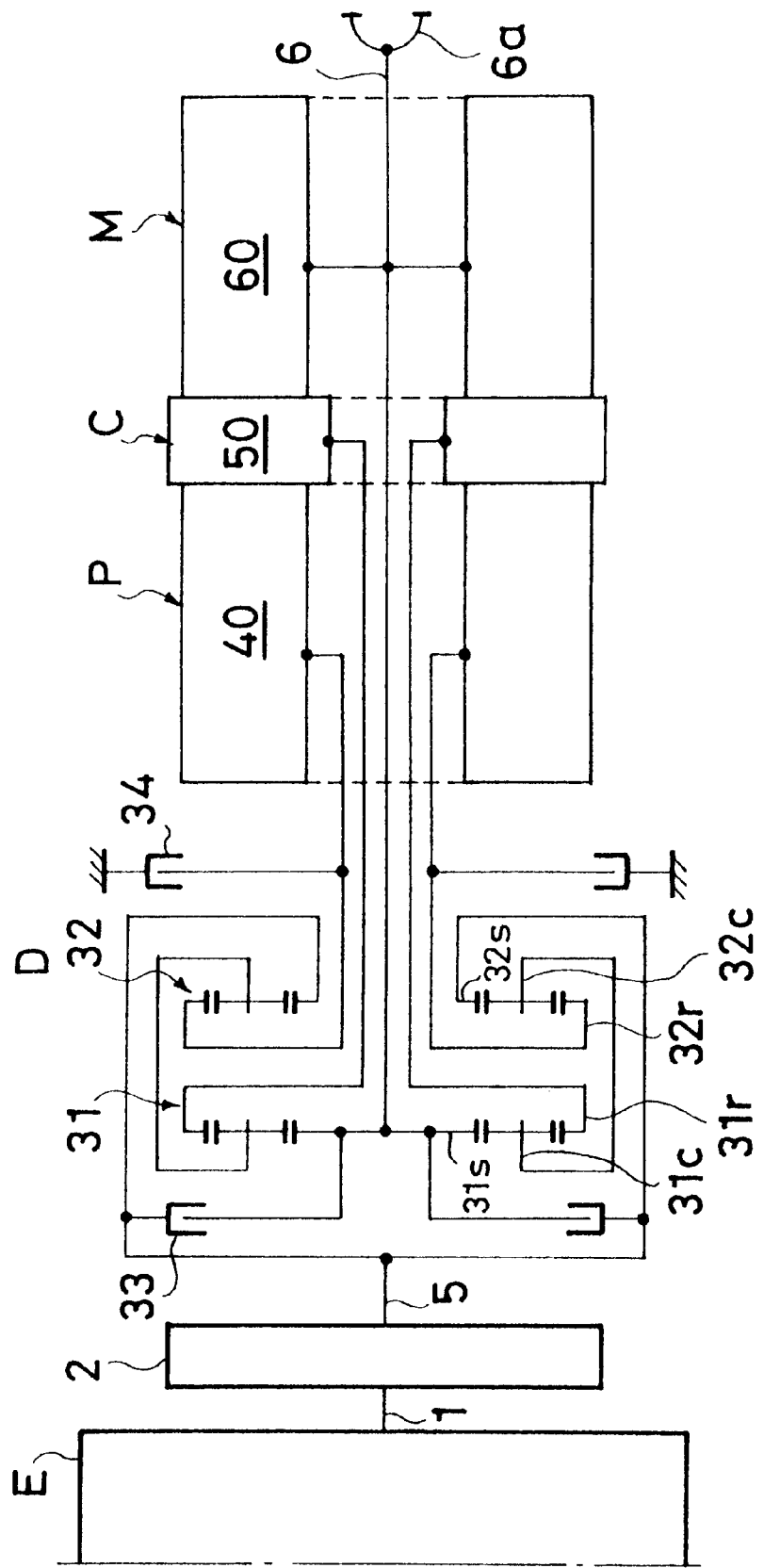
FIG. 5 is a skeleton diagram showing schematically the power transmission path of the continuously variable transmission which is shown in FIG. 1.

As seen from the construction shown in FIGS. 1–4 and the power transmission path shown in FIG. 5, this transmission, which is used for an FR drive vehicle, extends rearward in the vehicle. The input shaft 5 of the transmission is connected through a torque damper 2 to the output shaft 1 of the engine E, which is placed in the front part of the vehicle. This is a hydromechanical continuously variable transmission and comprises a mechanical drive transmission unit D and a hydrostatic continuous speed variation unit H, which includes a variable delivery swash plate pump P, a control block C and a variable displacement swash plate motor M. As shown in FIG. 1, the mechanical drive transmission unit D, the hydraulic pump P, the control block C, and the hydraulic motor M are arranged in series in this order respectively from the output shaft of the engine toward the rear part of the vehicle in the longitudinal direction.

As shown in the skeleton diagram of FIG. 5, the mechanical drive transmission unit D comprises first and second planetary gear trains 31 and 32, which are provided in parallel with the axis of the transmission. These planetary gear trains 31 and 32 comprise first and second sun gears 31s and 32s, first and second pinions (unnumbered), first and second carriers 31c and 32c, and first and second ring gears 31r and 32r, respectively. The mechanical drive transmission unit D, which functions as a power distribution mechanism, includes the input shaft 5 of the transmission, which is connected to the torque damper 2. The mechanical drive transmission unit D is integrated as a unit so that the whole unit is placed in the space defined and surrounded by a first casing 11 and a second casing 12.

The front part of the input shaft 5 of the transmission extends through the first casing 11, and it is connected to the torque damper 2. The rear part of the input shaft is connected indirectly to the first sun gear 31s through a lock-up clutch 33 and directly to the second sun gear 32s. The first and second carriers 31c and 32c are directly connected to each other, and the first ring gear 31r is connected and fixed to the control block C. The second ring gear 32r is connected directly to a pump cylinder block 40, and the second ring gear 32r and the pump cylinder block 40 are fixable by a lock-up brake 34. Furthermore, the first sun gear 31s is connected to the output shaft 6 of the transmission. In addition, a sprocket 35, which drives a charge pump (not shown) through a chain, is provided on the input shaft 5 of the transmission in the space surrounded by the first and second casings 11 and 12.

The hydraulic pump P comprises the pump cylinder block 40 having a plurality of cylinder bores 40a around the rotational axis thereof, a plurality of pump plungers 41, which are provided slidably in the cylinder bores 40a, and a pump swash plate 43 of variable skew angle, which slidably abuts on the shoes 42 that are pivotally attached to the tops of the plungers 41. The pump cylinder block 40 is connected directly to the second ring gear 32r and is in rotatable contact with a surface of the control block C.

The pump swash plate 43 includes trunnions 43a which are provided laterally on opposite sides, and these trunnions are held in bearings that are provided on a pump cover 13. In this construction, the pump swash plate is swiveled around a pump pivot axis Op which extends horizontally and perpendicularly to the axis of rotation of the pump (i.e., the pivot axis is perpendicular to the plane of the figure). Each bearing comprises a race 44a and rollers 44b on a curved bearing surface 13a of the pump cover. As the curved bearing surfaces 13a are provided with races 44a, no heat treatment is required for the curved bearing surfaces 13a. However, the curved bearing surfaces 13a may be heat treated so that the races 44a will be unnecessary.

In the lower part of the pump P, a pump swash plate servo actuator 45 extends forward from the control block C. A servo piston 45a, the top of which is connected to the lower portion of the pump swash plate 43 through a link member 46, reciprocates in a servo cylinder 45b, which is fixed to the control block C. As the servo piston 45a shifts back and forth, the swash plate 43 is swiveled around the pump pivot axis Op.

As shown in FIG. 1, the pump swash plate 43 can be oriented at any position between an upright position, where the swash plate is perpendicular to the axis of rotation of the pump and to the output shaft 6 of the transmission (i.e., the skew angle of the pump swash plate is zero α=0), and predetermined right and left maximally tilted positions, where the swash plate is swiveled clockwise to a maximum angle or counterclockwise to a maximum angle (i.e., α=α F(MAX) or α R(MAX)). By swiveling the swash plate, adjustment is made of the stroke of the pump plungers 41, which reciprocate in the cylinder bores when the pump cylinder block 40 is rotated. While the pump cylinder block 40 is rotated, if the swash plate is at the upright position, then the amount of stroke is zero, and the pump discharges no oil. As the swash plate is swiveled toward the maximally tilted position with an increasing skew angle, the amount of stroke gradually increases, and the pump discharges oil in a correspondingly increased amount. The direction of the oil flow is dependent on the direction of the tilt of the swash plate either toward the right maximally tilted position or toward the left maximally tilted position, and this tilt of the swash plate determines the direction of the vehicle whether it moves forward or rearward.

The control block C comprises a control block body 50, which is provided between the hydraulic pump P and the hydraulic motor M. The control block body 50 includes internal oil passages 51 (i.e., a pair of oil passages 51a and 51b, which will be described later), which constitute a hydraulic closed circuit that connects the hydraulic pump P and the hydraulic motor M. For this reason, the pump cylinder block 40 and a motor cylinder block 60 are in slidable contact with the front and rear surfaces of the control block body 50, respectively. Furthermore, the control block body 50 includes other internal oil passages for various controls, and the oil passages are connected, for example, to a high pressure relief valve, which will be described later. A valve unit V is provided under the pump swash plate servo actuator 45, and the oil passages in the control block body 50 are connected to the valve unit V, appropriately.

The hydraulic motor M comprises the motor cylinder block 60 having a plurality of cylinder bores 60a around the rotational axis thereof, a plurality of motor plungers 61, which are provided slidably in the cylinder bores 60a, and a motor swash plate 63 of variable skew angle, which slidably abuts on the shoes 62 that are pivotally attached to the tops of the motor plungers 61. The motor cylinder block 60 is coaxially connected to the output shaft 6 of the transmission and is in rotatable contact with the rear surface of the control block C.

In the same manner as the pump swash plate, the motor swash plate 63 also includes trunnions 63a which are provided laterally on opposite sides, and these trunnions are held in bearings that are provided on a motor cover 15. In this construction, the motor swash plate is swiveled around a motor pivot axis Om which extends horizontally and perpendicularly to the axis of rotation of the motor and to the output shaft 6 of the transmission (i.e., the pivot axis is perpendicular to the plane of the figure). Each bearing comprises a race 64a and rollers 64b on a curved bearing surface 15a of the motor cover 15. As the curved bearing surfaces 15a are provided with races 64a, no heat treatment is required for the curved bearing surfaces 15a. However, the curved bearing surfaces 15a may be heat treated so that the races 64a will be unnecessary.

In the lower part of the motor M, a motor swash plate servo actuator 65 extends rearward from the control block C. A servo piston 65a, the top of which is connected to the lower portion of the motor swash plate 63 through a link member 66, reciprocates in a servo cylinder 65b, which is fixed to the control block C. As the servo piston 65a shifts back and forth, the swash plate 63 is swiveled around the motor pivot axis Om.

As shown in FIG. 1, the motor swash plate 63 can be oriented at any position between an upright position, where the swash plate is perpendicular to the axis of rotation of the motor and to the output shaft 6 of the transmission (i.e., the skew angle of the motor swash plate is zero β=0), and a predetermined maximally tilted position, where the upper part of the swash plate is swiveled forward to a maximum angle (β=β (MAX)). By swiveling the swash plate, adjustment is made of the stroke of the motor plungers 61, which reciprocate in the cylinder bores when the motor cylinder block 60 is rotated. While a predetermined hydraulic pressure is applied to the hydraulic motor M by the hydraulic pump P, the rotation of the motor cylinder block 60 is adjustable. If the swash plate is at the upright position, then the motor cylinder block 60 is retained stationary. On the other hand, the rotational speed of the motor cylinder block 60 gradually increases as the skew angle β decreases while the swash plate is swiveled from the maximally tilted position toward the upright position (provided that a constant flow of oil is supplied by the hydraulic pump P). It should be noted that the motor swash plate 63 can be swiveled only between the upright position and the counterclockwisely and maximally tilted position as shown in the figure.

The output shaft 6 of the transmission is provided with a coupling member 6a at the rear end thereof, and the output shaft 6 is connected with the propeller shaft through this coupling member 6a to transmit the drive power to the rear wheels. In addition, a parking brake gear 8 is provided near the rear end of the output shaft 6 as shown in FIG. 4.

Operation of the Transmission

Now, the operation of the above continuously variable transmission is described. When the engine E is started, the engine output is transmitted from the output shaft 1 of the engine through the torque damper 2 to the transmission. In this condition, the input shaft 5 and the second sun gear 32s of the transmission are driven at the same rotational speed as the output shaft 1 of the engine while the lock-up clutches 33 and 34 are not in engagement. As the second sun gear 32s is driven, the power from the engine is divided into two portions, and one portion is transmitted to the pump cylinder block 40 through the second planetary gear train 32 and the other to the output shaft 6 of the transmission through the first planetary gear train 31.

Figure 6:
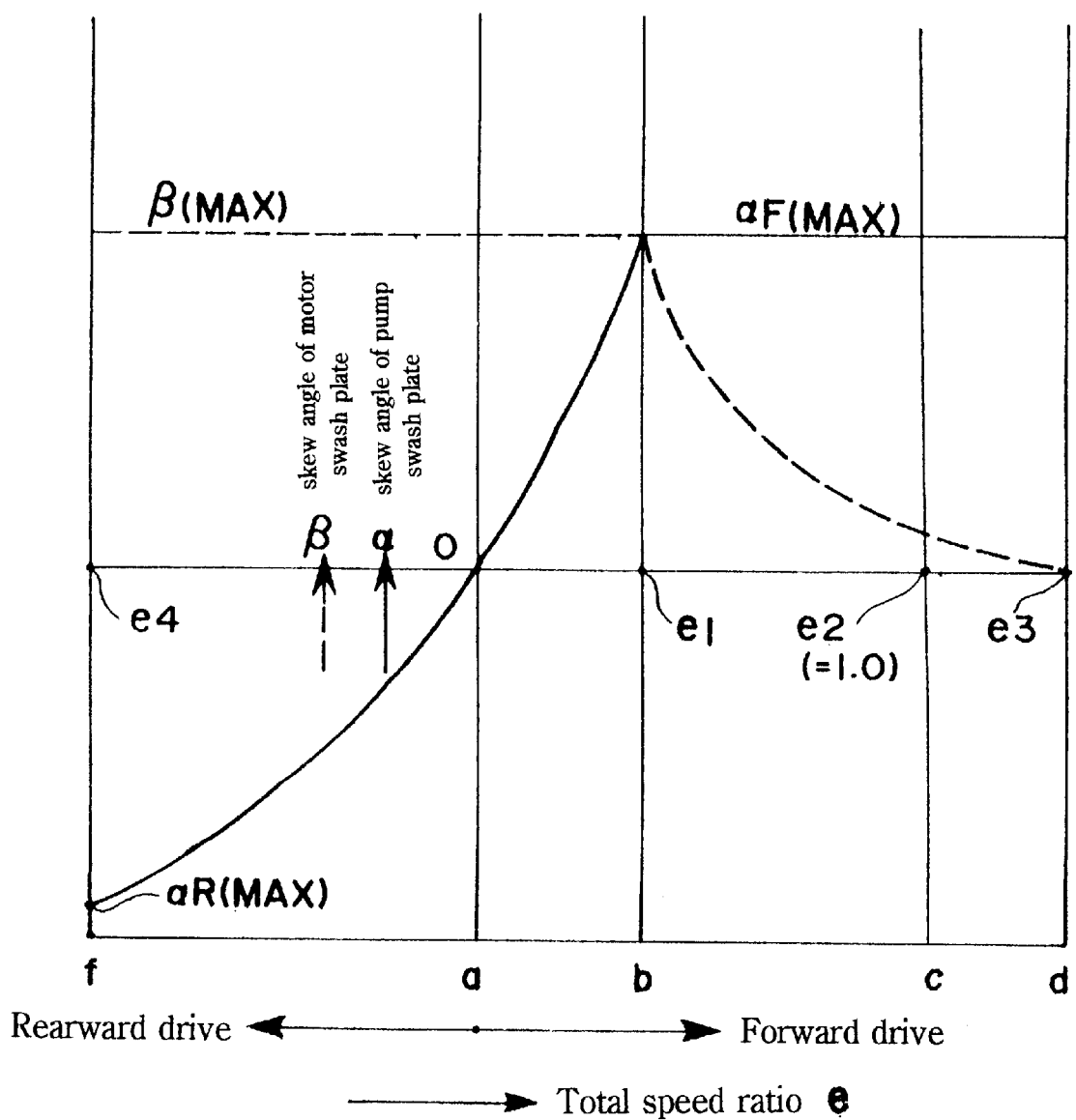
FIG. 6 is a graph showing a relation between the total speed ratio and the skew angles of the pump and motor swash plates of the continuously variable transmission which is shown in FIG. 1.

How the power is divided depends on the skew angles of the swash plates of the hydraulic pump P and the hydraulic motor M. Therefore, reference is made to FIG. 6, which shows relations between the skew angles α and β of the swash plates of the pump and the motor and the total speed ratio e of the transmission. The total speed ratio e is the ratio of the output rotational speed to the input rotational speed of the transmission, and it is given in Equation (1). In FIG. 6, the ordinate represents the skew angles of the swash plates of the pump and the motor. The rightward tilts of the swash plates are plotted in the positive quadrants while the leftward tilts are plotted in the negative quadrants. Therefore, the skew angles of the motor swash plate are plotted only in the positive quadrants. The abscissa represents the total speed ratio e, and the speed ratio in forward drive is plotted in the positive quadrants while the speed ratio in rearward drive is plotted in the negative quadrants. In the figure, the skew angle of the swash plate of the pump is shown in real line while that of the motor is shown in dotted line.

$$\text{Total speed ratio } e=(No)/(Ni) \tag{1}$$

where Ni is the rotational speed of the input shaft 5 of the transmission, and No is the rotational speed of the output shaft 6 of the transmission.

When the pump swash plate 43 is at the upright position ($\alpha=0$) and the motor swash plate 63 is at the maximally tilted position ($\beta=\beta$ (MAX)), the pump cylinder block 40 is rotatable freely, and the pump discharges no oil. In this condition, the motor cylinder block 60 is hydraulically locked and retained stationary because no oil is supplied thereto from the pump P. As a result, the first sun gear 31s, which is directly connected to the motor cylinder block 60, is retained stationary, and the first and second carriers 31c and 32c are also stationary as the first ring gear 31r is permanently fixed. However, the second sun gear 32s driven by the engine transmits the rotational drive through the pinions and the second ring gear 32r of the second planetary gear train 32 to the pump cylinder block 40, thereby rotating the pump cylinder block 40 freely, because no power is transmitted to the output shaft 6 of the transmission, i.e., to the rear wheels of the vehicle. This condition, in which the engine output is wasted in idling, is depicted by vertical line "a" in FIG. 6. In this condition, the total speed ratio is zero (e=0), and the transmission is in a neutral condition.

This condition is the neutral condition that is established when the shift lever, which is operated by the driver at the driver seat, is set in the D or R range, i.e., a vehicle drive range. If the shift lever is set in the P or N range, then the skew angle of the motor swash plate is controlled to zero ($\beta=0$) so that the motor cylinder block 60 also becomes freely rotatable, establishing a neutral condition.

As the pump swash plate 43 is swiveled clockwise from this condition, the discharge of oil from the pump P starts and increases in correspondence with the increase of the skew angle of the swash plate. The oil discharged from the pump P is supplied to the motor M, and this supply of oil rotates the motor cylinder block 60 and the output shaft 6 of the transmission, which is connected to the motor cylinder block. In this condition, the rotational drive power is transmitted from the output shaft 6 of the transmission through the propeller shaft (not shown) to the rear wheels, and the rear wheels are driven in the forward direction.

The rotational speed of the output shaft 6 of the transmission increases as the skew angle $\alpha$ of the pump swash plate increases. When the skew angle becomes the maximum skew angle in the forward drive direction $\alpha$ F(MAX), the condition reaches the point which is indicated by vertical line "b" in FIG. 6. Therefore, the total speed ratio e increases from zero (vertical line "a") to e1 (vertical line "b"). On the other hand, the rotational speed of the pump cylinder block 40 decreases as the rotational speed of the output shaft 6 of the transmission increases. The reason is that as the mechanical power transmission through the mechanical drive transmission unit D increases, the planetary gear trains, which constitute the mechanical drive transmission unit D, act to lower the rotational speed of the pump cylinder block 40.

After the pump swash plate achieves the maximum skew angle in the forward drive direction $\alpha$ F(MAX) (i.e., reaches the condition indicated by vertical line "b"), the motor swash plate is swiveled to make the skew angle $\beta$ thereof gradually decrease from the maximum angle. As the skew angle $\beta$ becomes smaller and smaller, the rotational speed of the motor cylinder block 60 (and the output shaft 6 of the transmission) increases further above the speed which is indicated by vertical line "b". When the skew angle $\beta$ becomes zero (i.e., the swash plate comes to the upright position), the rotational speed reaches the maximum speed (i.e., the total speed ratio becomes e3, and this condition is indicated by vertical line "d" in the figure).

Here, the total speed ratio is greater than one (e3>1.0), i.e., the speed reduction ratio is smaller than 1.0, which is an overdrive condition. This condition is achieved by predetermining the gear ratio of the mechanical drive transmission unit D in such a way that the total speed ratio will reach one (e2=1.0), which condition is indicated by vertical line "c" in FIG. 6, before the skew angle $\beta$ of the motor swash plate becomes zero. When the total speed ratio is one (e2 =1.0), the rotational speed of the input shaft 5 of the transmission equals that of the output shaft 6 of the transmission. In this condition, the lock-up clutch 33 is engaged to eliminate the power transmission loss through the mechanical drive transmission unit D and to improve the transmission efficiency.

However, as mentioned previously, as the rotational speed of the output shaft 6 of the transmission increases, the mechanical power transmission through the mechanical drive transmission unit D increases, and the rotational speed of the pump cylinder block 40 decreases. The gear ratio of the mechanical drive transmission unit D is predetermined in such a way that the rotational speed of the pump cylinder block 40 becomes zero when the skew angle $\beta$ of the motor swash plate becomes zero (i.e., the swash plate comes to the upright position). Therefore, when the motor swash plate is at the upright position ($\beta=0$), the motor cylinder block 60 is freely rotatable, and the pump cylinder block 40 is hydraulically locked and held stationary. In this condition (which is indicated by vertical line "d" in the figure), theoretically, only the mechanical power transmission through the mechanical drive transmission unit D is performed (if there is no transmission loss, and the efficiency of transmission is 100%). However, in reality, there is a loss from oil leak, etc., so the lock-up brake 34 is controlled to hold the pump cylinder block 40 stationary to improve the transmission efficiency.

On the other hand, if the pump swash plate 43 is swiveled counterclockwise, starting from the condition indicated by vertical line "a" in the figure, then the oil is discharged from the pump P in the direction opposite to that described above in the hydraulic closed circuit. This reversed flow of oil to the motor M drives the motor cylinder block 60 in the direction opposite to that described above (i.e., in the rearward drive direction). The rotational speed of the motor cylinder block 60 increases as the skew angle $\alpha$ of the pump swash plate increases. When the skew angle becomes the maximum skew angle $\alpha$ R(MAX), the condition reaches the point which is indicated by vertical line "f" in FIG. 6. In this way, the total speed ratio e changes from zero (vertical line "a") to a negative value e4. In this phase, the mechanical power transmission through the mechanical drive transmission unit D is also carried out simultaneously as the motor cylinder block 60 rotates, as mentioned previously.

Hydraulic Control Circuit

Figure 7:
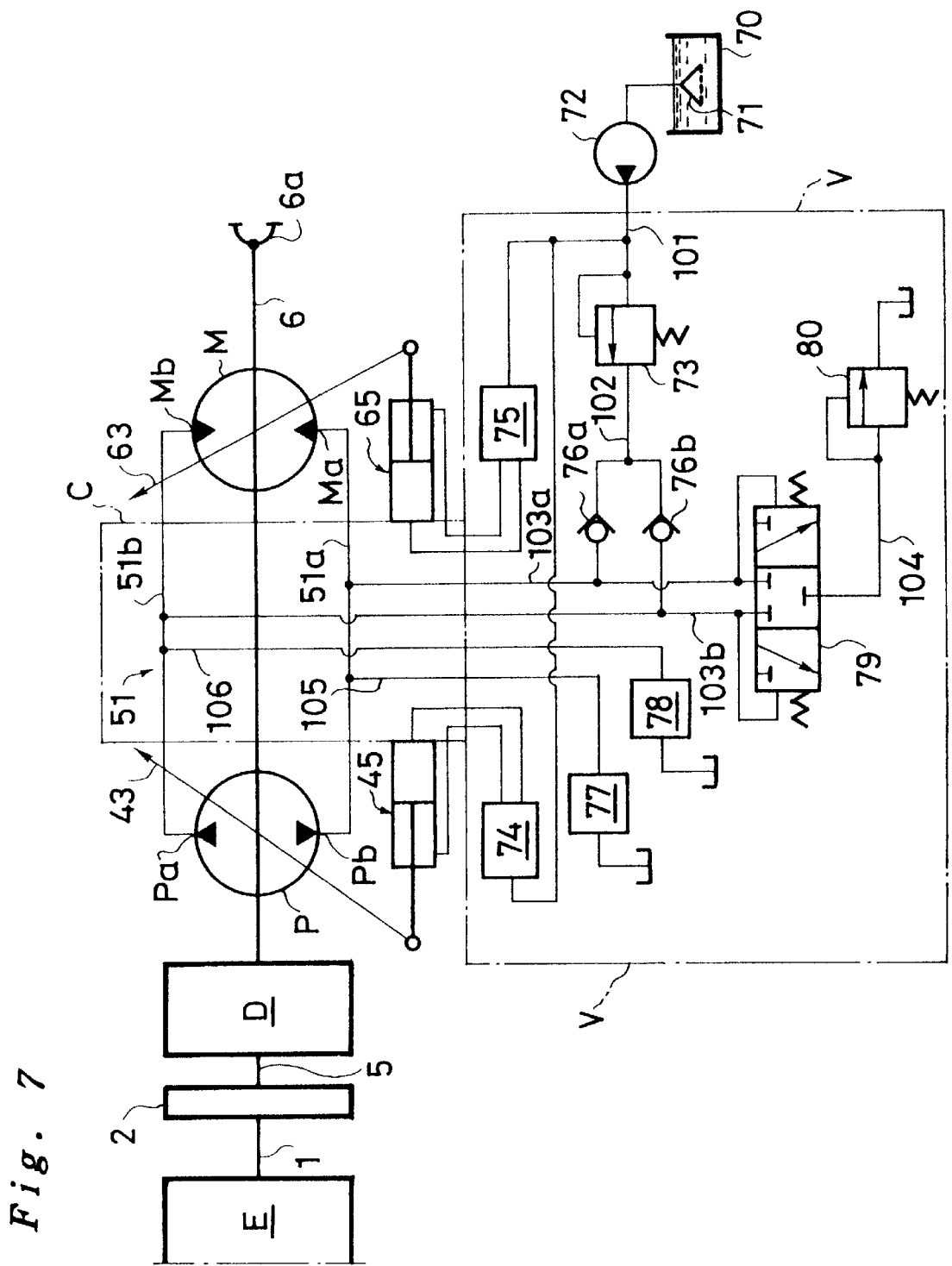
FIG. 7 is a hydraulic circuit diagram showing the hydraulic control system of the continuously variable transmission which is shown in FIG. 1.

Now, with reference to FIG. 7, a description is made of the hydraulic closed circuit for power transmission and the system or circuit for hydraulic control which are provided in the above hydraulic continuously variable transmission. In this figure, the hydraulic pump P and the hydraulic motor M are illustrated in symbols. The hydraulic closed circuit 51 comprises a first oil passage 51a which connects one port Pb of the pump P with one port Ma of the motor M and a second oil passage 51b which connects the other port Pa of the pump P with the other port Mb of the motor M.

As mentioned previously, the swash plate 43 of the pump P is swiveled in either direction, clockwise or counterclockwise, from the upright position (i.e., a neutral position). When the pump swash plate is swiveled clockwise (i.e., in the forward drive direction), the oil sucked from the port Pa is discharged from the port Pb. This oil is supplied to the motor M through the port Ma to drive the motor M in the forward drive direction. Then, the oil is discharged from the port Mb, again to be sucked into the port Pa, thus circulating in the closed circuit 51. In this condition, if the wheels are driven by the rotation of the motor M, then, in correspondence to this rotational drive, the pressure in the first oil passage 51*a* becomes high while the pressure in the second oil passage 51*b* become low. On the other hand, if the rotational speed of the wheels are being reduced by engine brake while the vehicle is in coasting, then the pressure in the second oil passage 51*b* becomes high in proportion to the force of the engine brake, and the pressure in the first oil passage 51*a* become low.

When the pump swash plate 43 is swiveled counterclockwise (i.e., in the rearward drive direction), the oil flow is reversed from that described above. This reversed oil flow drives the motor in the rearward drive direction. Likewise, the pressures in the first and second oil passages 51*a* and 51*b* become opposite to what is described above.

Figure 2:
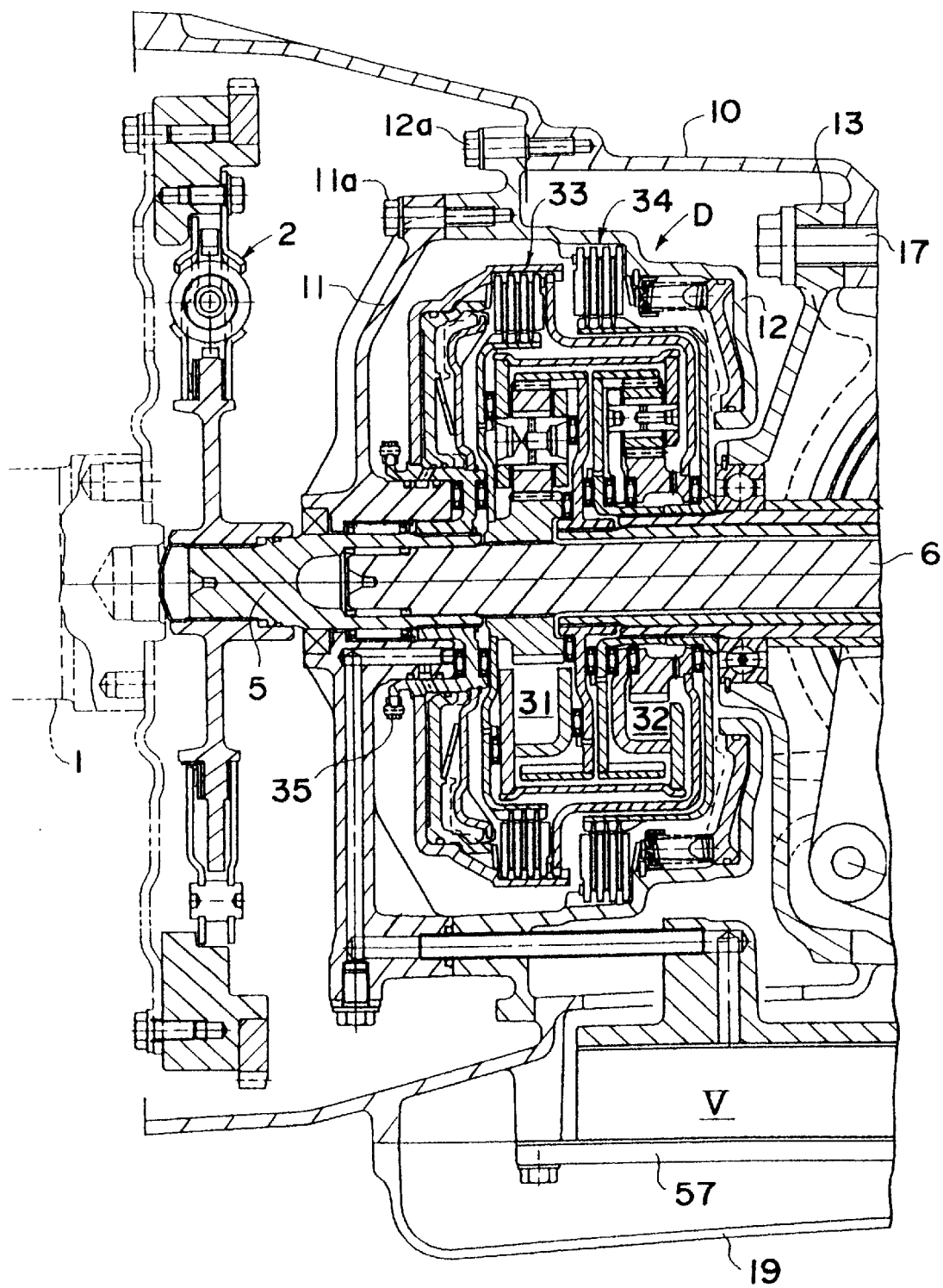
FIG. 2 is an enlarged sectional view of the left side portion of the continuously variable transmission which is shown in FIG. 1.

In this way, the power transmission between the hydraulic pump and the hydraulic motor is performed. In this power transmission, while the oil is circulated in the hydraulic closed circuit 51, heat is generated, and the temperature of the oil will rise. Also, in the circulation, contaminants may be collected in the oil, or some part of the oil may leak, for example, through the clearance of the plungers, into an oil tank. To solve such problems, the system enables part of the oil to be exchanged for cooling, supplementary feed, and purification (or flashing). A charge pump 72 is provided to supply oil in the oil tank 70 into a first line 101 through a suction filter 71. The charge pump 72 is driven directly by the engine E through the chain attached to the sprocket 35, which is shown in FIG. 2, so the discharge of the charge pump is proportional to the rotational speed of the engine.

The oil discharged from the charge pump 72 into the first line 101 is regulated by a regulator valve 73 to have a predetermined line pressure PL, and the first line 101 is connected to a pump servo control valve 74 and to a motor servo control valve 75 as shown in the figure so that the line pressure PL is supplied to these valves. The pump servo control valve 74 is to control the supply of the line pressure PL to the pump swash plate servo actuator 45, which swivels the pump swash plate, and the motor servo control valve 75 is to control the supply of the line pressure PL to the motor swash plate servo actuator 65, which swivels the motor swash plate.

On the other hand, the oil which passes through the regulator valve 73 flows into a second line 102, which branches and leads to check valves 76*a* and 76*b*. These check valves 76*a* and 76*b* are connected to the first and second oil passages 51*a* and 51*b* through third lines 103*a* and 103*b*, respectively. Therefore, the oil flowing to the second line 102 is supplied to either the first oil passage 51*a* or the second oil passage 51*b* which has a lower pressure than the other. In this way, the oil in the hydraulic closed circuit 51 is replenished.

In addition, the third lines 103*a* and 103*b* are connected also to a shuttle valve 79 so that either the first or second oil passage 51*a* or 51*b* whose pressure is lower than the other is connected through the shuttle valve 79 with a fourth line 104 which leads to a low pressure relief valve 80. In this condition, the pressure of either the first or second oil passage 51*a* or 51*b* whose pressure is lower than the other is controlled to a predetermined low pressure by the low pressure relief valve 80. At the same time, some oil from the hydraulic closed circuit 51 is discharged through the low pressure relief valve 80 in the amount which corresponds with the amount replenished through the check valves 76*a* and 76*b* as described above. In this way, some part of the hydraulic oil in the hydraulic closed circuit is replaced for cooling, replenishing, flashing, etc.

Figure 8:
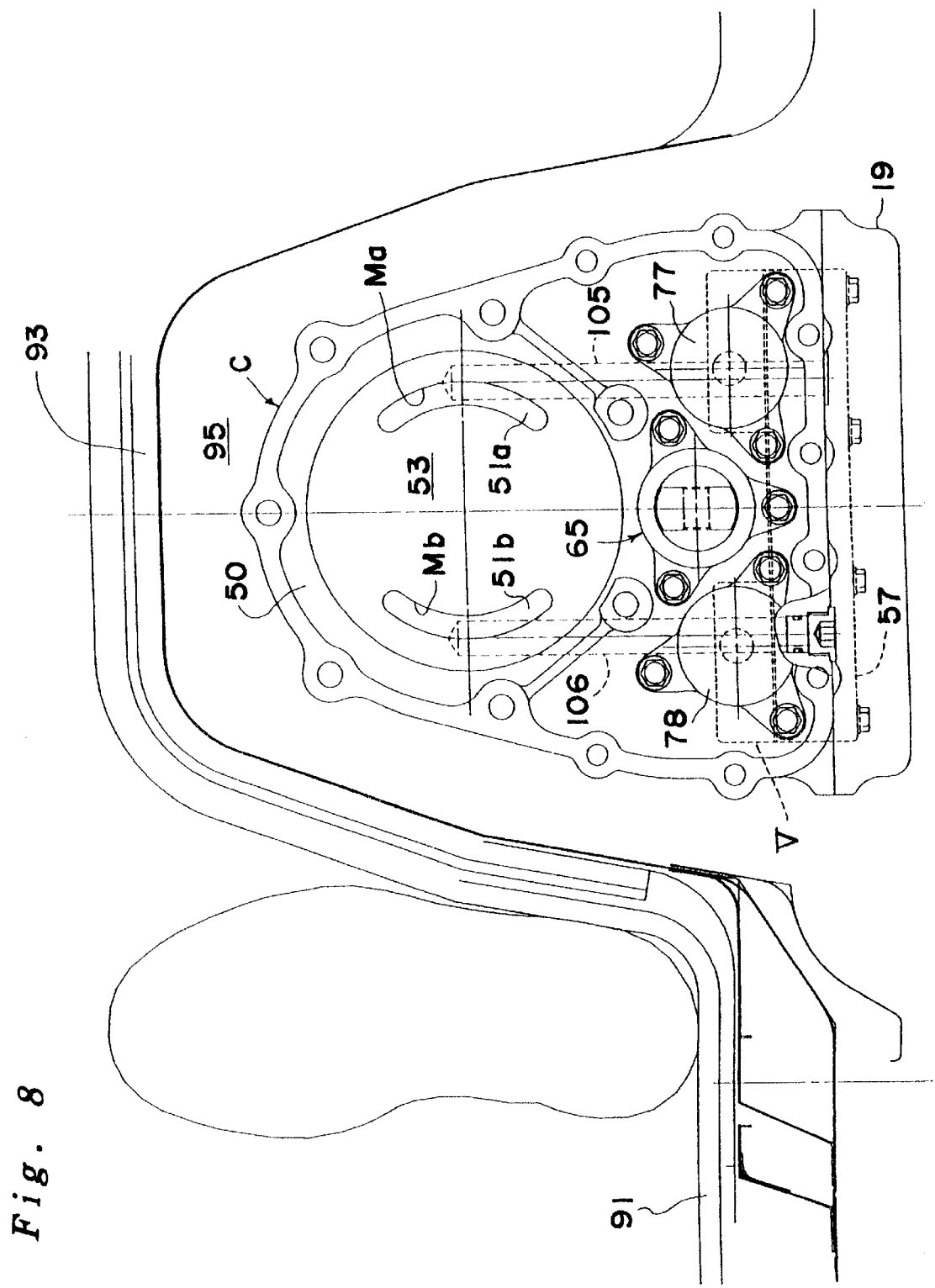
FIG. 8 is a sectional view of the continuously variable transmission, taken along line VIII—VIII in FIG. 1.

Moreover, the first and second oil passages 51*a* and 51*b* are connected through fifth and sixth lines 105 and 106 to high pressure relief valves 77 and 78, which control the maximum pressures of the first and second oil passages 51*a* and 51*b*, respectively. Furthermore, such valves as to control the actuation of the lock-up clutch 33 and the lock-up brake 34 are also provided though not shown in the figure. These valves constitute the above mentioned valve unit V, which is mounted under the pump swash plate servo actuator 45 as shown in FIGS. 1 and 8.

The control block body 50 is provided with a pump sliding surface 52 (refer to FIG. 3), with which the pump cylinder block 40 is in slidable contact, and a motor sliding surface 53 (refer to FIGS. 4 and 8), with which the motor cylinder block 60 is in slidable contact, on the front and rear faces thereof, respectively. The above mentioned ports Pa and Pb of the pump P and the ports Ma and Mb of the motor M are provided in these sliding surfaces 52 and 53; and the first oil passage 51*a*, which connects the port Pb with the port Ma, and the second oil passage 51*b*, which connects the port Pa with the port Mb, are provided through and inside the control block body 50 in the longitudinal direction of the transmission. Also, the above mentioned fifth and sixth lines 105 and 106, which lead the first and second oil passages 51*a* and 51*b* to the high pressure relief valves 77 and 78 respectively are each formed as a drill hole, which extends upward from the lower face of the control block body 50 as shown in FIG. 8. The high pressure relief valves 77 and 78 are mounted on the rear face of the control block body 50, and through this rear face, the fifth and sixth lines 105 and 106 are connected to the high pressure relief valves 77 and 78 for the control of the high pressures of the first and second oil passages. Furthermore, the third lines 103*a* and 103*b*, which lead to the check valves 76*a* and 76*b* and the shuttle valve 79, are also formed in the control block body 50 and are connected to the respective valves of the control valve unit V.

Overall Configuration

The above described speed change mechanism of the transmission is mounted in a first housing 10, which is attached to the rear face of the engine, and in a second housing 14, which is attached to the control block C, surrounding the motor M. This assembly is described in more detail in the following. At first, the first housing 10 is mounted on the control block C by putting the rear face of the first housing 10 on the front face of the control block C (or the control block body 50), and the hydraulic pump P is mounted in a space which is provided in the rear side of the first housing 10. Then, the pump cover 13, which covers this rear space, is fixed with bolts 17. As described previously, the pump cover 13, which has the lateral curved bearing surfaces 13*a*, retains the trunnions 43*a* which are pivotable on the curved bearing surfaces 13*a* through the races 44*a* and the rollers 44*b*.

In this configuration, as the trunnions 43*a* are supported on the pump cover 13, which is connected to the control block body 50 through the bolts 17, with the first housing 10 being sandwiched between them, the reaction forces of the pump plungers 41 being generated in the hydraulic pump P and received on the trunnions 43a are passed from the pump cover 13 through the bolts 17 to the control block body 50 with no effect on the first housing 10. Therefore, while the control block body 50 and the pump cover 13 are made of such a material as cast steel to provide a required high strength and a stiffness, the first housing 10 can be made of such a material as cast aluminum or cast iron, which is commonly used.

On the other hand, as mentioned previously, the mechanical drive transmission unit D is mounted in the space surrounded by the first and second casings 11 and 12. In this condition, the intermating first and second casings 11 and 12 joined by bolts 11a and the mechanical drive transmission unit D enclosed therein constitute an independent unit, which is positioned in front of the pump cover 13 as if the unit were covering the pump cover 13. This independent unit is fixed with bolts 12a to the first housing 10 as shown in FIGS. 1 and 2.

Furthermore, the motor M is mounted in the second housing 14, which is mounted on the rear face of the control block body 50, and a motor cover 15 is mounted on the rear face of the second housing 14 and fixed with bolts 18. In this configuration, which is similar to that of the pump P, as the trunnions 63a of the motor M are supported on the motor cover 15, which is connected to the control block body 50 through the bolts 18, with the second housing 14 being sandwiched between them, the reaction forces of the motor plungers 61 being generated in the hydraulic motor M and received on the trunnions 63a are passed from the motor cover 15 through the bolts 18 to the control block body 50 with no effect on the second housing 14. Therefore, while the motor cover 15 is made of a material that has high strength and stiffness such as cast steel, the second housing 14 can be made of a material such as cast aluminum or cast iron.

After the parking gear 8 is mounted on the output shaft 6 of the transmission, which extend rearward beyond the second housing 14, a rear end cover 16 is mounted. In addition, the coupling member 6a is mounted on the end portion of the output shaft 6 of the transmission. Furthermore, an opening is provided in the lower part of the first housing 10, and a valve support plate 57, which has the valve unit V on the upper surface thereof, is mounted in the opening. For covering the whole opening, an oil pan 19 is provided.

The transmission, which is assembled as described above, is mounted on the engine by attaching the front face of the first housing 10 to the fly-wheel housing of the engine, and the input shaft 5 of the transmission is engaged to the torque damper 2 with splines. In this condition, as the transmission is connected to the rear end of the engine, which is placed in the front part of the vehicle (under the bonnet), the transmission comes into a floor tunnel 95, which extends longitudinally in the center of the floor 91 of the cabin, as shown in FIG. 8. In this configuration, the transmission, which extends longitudinally in the vehicle, requires a relatively small cross-sectional area for the floor tunnel 95. Therefore, the transmission is easily mountable even if the floor tunnel 95 is made with a relatively small cross-sectional area. Especially as the pump and motor swash plate servo actuators 45 and 65 are positioned in the lower part of the transmission, the height and width of a flooring member 93, which constitutes the floor tunnel 95, can be made relatively low and narrow, providing additional room for the cabin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable transmission for use on a vehicle, said transmission being provided in a power transmission path which transmits rotational drive power from an output shaft of a prime motor to rear wheels of the vehicle to change the rotational drive power of said prime motor in continuos speed variation, wherein:

said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle;

a hydraulic servo mechanism for causing swiveling of said swash plates of said hydraulic pump and said hydraulic motor; and a hydraulic control means that performs various hydraulic control operations;

said hydraulic servo mechanism and said hydraulic control means being physically located and mounted under said hydraulic continuously variable transmission mechanism.

2. The continuously variable transmission for use on the vehicle, as set forth in claim 1 wherein:

pivot axis members, around which said swash plates are swiveled, are provided and have a pivot axis extending laterally and horizontally;

when the swash plate of said hydraulic pump is positioned at a maximum skew angle for forward drive of the vehicle, a lower end of the swash plate of said hydraulic pump is located forward from the pivot axis thereof; and when the swash plate of said hydraulic motor is positioned at a maximum skew angle, a lower end of the swash plate of said hydraulic motor is located rearward from the pivot axis thereof.

3. The continuously variable transmission for use on the vehicle, as set forth in claim 1 wherein:

a control block is provided between said hydraulic pump and said hydraulic motor, and said hydraulic closed circuit is provided inside this control block.

4. The continuously variable transmission for use on the vehicle, as set forth in claim 3 wherein:

a high pressure relief valve for setting a relief pressure in said hydraulic closed circuit is mounted on a lower portion of said control block.

5. The continuously variable transmission for use on the vehicle, as set forth in claim 4 wherein:

said hydraulic servo mechanism is mounted and supported on the lower portion of said control block, and said high pressure relief valve is provided in parallel with said hydraulic servo mechanism.

6. The continuously variable transmission for use on the vehicle, as set forth in claim 1 wherein:

a mechanical drive transmission unit comprising a planetary gear train is provided in series between the output shaft of said prime motor and an input shaft of said hydraulic continuously variable transmission mechanism.

7. The continuously variable transmission for use on the vehicle, as set forth in claim 3 wherein:

a first housing is provided on a rear face of said prime motor;

said control block is mounted on said first housing by attaching a front face of said control block to a rear face of said first housing;

said hydraulic pump is mounted in a rear space of said first housing; and a pump cover is provided covering said rear space.

8. The continuously variable transmission for use on the vehicle, as set forth in claim 7 wherein:

said pump cover is fixed with bolts which are screwed into said control block through said first housing;

said pump cover includes curved bearing surfaces which are provided laterally on each side; and trunnions which function as said pivot axis members as a fulcrum for swiveling the swash plate of said hydraulic pump are provided pivotally on said curved bearing surfaces.

9. The continuously variable transmission for use on the vehicle, as set forth in claim 8 wherein:

a body of said control block and said pump cover are made of cast steel, and said first housing is made of at least one of cast aluminum and cast iron.

10. The continuously variable transmission for use on the vehicle, as set forth in claim 7 wherein:

a mechanical drive transmission unit comprising a planetary gear train is provided in series between the output shaft of said prime motor and an input shaft of said hydraulic continuously variable transmission mechanism; and said mechanical drive transmission unit is an independent unit which is mounted in a space surrounded by first and second casings in front of said pump cover in said first housing.

11. The continuously variable transmission for use on the vehicle, as set forth in claim 7 wherein:

a second housing is provided on a rear face of said control block, covering said hydraulic motor; and a motor cover is provided on a rear face of said second housing.

12. The continuously variable transmission for use on the vehicle, as set forth in claim 11 wherein:

said motor cover is fixed with bolts which are screwed into said control block through said second housing;

said motor cover includes curved bearing surfaces which are provided laterally on each side; and trunnions which function as said pivot axis members as a fulcrum for swiveling the swash plate of said hydraulic motor are provided pivotally on said curved bearing surfaces.

13. The continuously variable transmission for use on the vehicle, as set forth in claim 11 wherein:

a body of said control block and said motor cover are made of cast steel, and said second housing is made of cast aluminum or cast iron.

14. The continuously variable transmission for use on the vehicle, as set forth in claim 1 wherein:

said prime motor is placed under a bonnet in a front portion of the vehicle;

said continuously variable transmission, which is connected to the output shaft located at a rear end of said prime motor, extends inside a floor tunnel that extends longitudinally in a floor of a cabin at a widthwise center of the vehicle.

15. A continuously variable transmission for use on a vehicle, said transmission being provided in a power transmission path which transmits rotational drive power from an output shaft of a prime motor to rear wheels of the vehicle to change the rotational drive power of said prime motor in continuous speed variations, wherein:

said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle;

a hydraulic servo mechanism that swivels the swash plates of said hydraulic pump and said hydraulic motor and a hydraulic control means that performs various hydraulic control operations are placed under said hydraulic continuously variable transmission mechanism;

pivot axis members, around which said swash plates are swiveled, being provided and having a pivot axis extending laterally and horizontally;

the swash plate of said hydraulic pump being swiveled between a forward drive maximum skew angle and a rearward drive maximum skew angle with an upright position of the swash plate existing therebetween;

said forward drive maximum skew angle being greater than said rearward drive maximum skew angle;

when the swash plate of said hydraulic pump is positioned at said forward drive maximum skew angle, a lower end of the swash plate of said hydraulic pump is located forward from the pivot axis thereof; and when the swash plate of said hydraulic motor is positioned at a maximum skew angle, a lower end of the swash plate of said hydraulic motor is located rearward from the pivot axis thereof.

16. A continuously variable transmission for use on a vehicle, said transmission being provided in a power transmission path which transmits rotational drive power from an output shaft of a prime motor to rear wheels of the vehicle to change the rotational drive power of said prime motor in continuous speed variations, wherein:

said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle; and a hydraulic servo mechanism that swivels the swash plates of said hydraulic pump and said hydraulic motor and a hydraulic control means that performs various hydraulic control operations are placed under said hydraulic continuously variable transmission mechanism;

pivot axis members, around which said swash plates are swiveled, being provided and having a pivot axis extending laterally and horizontally;

the swash plate of said hydraulic motor being swiveled between an upright position and a position where the swash plate is titled at a maximum skew angle;

when the swash plate of said hydraulic pump is positioned at a maximum skew angle for forward drive of the vehicle, a lower end of the swash plate of said hydraulic pump is located forward from the pivot axis thereof; and when the swash plate of said hydraulic motor is positioned at a maximum skew angle, a lower end of the swash plate of said hydraulic motor is located rearward from the pivot axis thereof.

17. The continuously variable transmission for use on the vehicle, as set forth in claim 15, or 16, wherein:
 a control block is provided between said hydraulic pump and said hydraulic motor, and said hydraulic closed circuit is provided inside this control block.

18. The continuously variable transmission for use on the vehicle, as set forth in claim 17 wherein:
 a high pressure relief valve for setting a relief pressure in said hydraulic closed circuit is mounted on a lower portion of said control block.

19. The continuously variable transmission for use on the vehicle, as set forth in claim 18 wherein:
 said hydraulic servo mechanism is mounted and supported on the lower portion of said control block, and said high pressure relief valve is provided in parallel with said hydraulic servo mechanism.

20. The continuously variable transmission for use on the vehicle, as set forth in claim 15 or 16, wherein:
 a mechanical drive transmission unit comprising a planetary gear train is provided in series between the output shaft of said prime motor and an input shaft of said hydraulic continuously variable transmission mechanism.

21. The continuously variable transmission for use on the vehicle, as set forth in claim 17 wherein:
 a first housing is provided on a rear face of said prime motor;
 said control block is mounted on said first housing by attaching a front face of said control block to a rear face of said first housing;
 said hydraulic pump is mounted in a rear space of said first housing; and
 a pump cover is provided covering said rear space.

22. The continuously variable transmission for use on the vehicle, as set forth in claim 21 wherein:
 said pump cover is fixed with bolts which are screwed into said control block through said first housing;
 said pump cover includes curved bearing surfaces which are provided laterally on each side; and
 trunnions which function as said pivot axis members as a fulcrum for swiveling the swash plate of said hydraulic pump are provided pivotally on said curved bearing surfaces.

23. The continuously variable transmission for use on the vehicle, as set forth in claim 22 wherein:
 a body of said control block and said pump cover are made of cast steel, and said first housing is made of at least one of cast aluminum and cast iron.

24. The continuously variable transmission for use on the vehicle, as set forth in claim 21 wherein:
 a mechanical drive transmission unit comprising a planetary gear train is provided in series between the output shaft of said prime motor and an input shaft of said hydraulic continuously variable transmission mechanism; and
 said mechanical drive transmission unit is an independent unit which is mounted in a space surrounded by first and second casings in front of said pump cover in said first housing.

25. The continuously variable transmission for use on the vehicle, as set forth in claim 21 wherein:
 a second housing is provided on a rear face of said control block, covering said hydraulic motor; and
 a motor cover is provided on a rear face of said second housing.

26. The continuously variable transmission for use on the vehicle, as set forth in claim 25 wherein:
 said motor cover is fixed with bolts which are screwed into said control block through said second housing;
 said motor cover includes curved bearing surfaces which are provided laterally on each side; and
 trunnions which function as said pivot axis members as a fulcrum for swiveling the swash plate of said hydraulic motor are provided pivotally on said curved bearing surfaces.

27. The continuously variable transmission for use on the vehicle, as set forth in claim 26 wherein:
 a body of said control block and said motor cover are made of cast steel, and said second housing is made of at least one of cast aluminum and cast iron.

28. The continuously variable transmission for use on the vehicle, as set forth in claim 15 or 16 wherein:
 said prime motor is placed under a bonnet in a front portion of the vehicle;
 said continuously variable transmission, which is connected to the output shaft located at a rear end of said prime motor, extends inside a floor tunnel that extends longitudinally in a floor of a cabin at a widthwise center of the vehicle.

29. A continuously variable transmission for use on a vehicle, said transmission being provided in a power transmission path which transmits rotational drive power from an output shaft of a prime motor to rear wheels of the vehicle to change the rotational drive power of said prime motor in continuous speed variation, wherein:
 said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle;

a hydraulic servo mechanism that swivels the swash plates of said hydraulic pump and said hydraulic motor and a hydraulic control means that performs various hydraulic control operations are placed under said hydraulic continuously variable transmission mechanism;

a control block provided between said hydraulic pump and said hydraulic motor, and said hydraulic closed circuit being provided inside this control block;

a first housing provided on a rear face of the prime motor;

said control block being mounted on said first housing by attaching a front face of said control block to a rear face of said first housing;

said hydraulic pump being mounted in a rear space of said first housing;

a pump cover provided covering said rear space;

said pump cover being fixed with bolts which are screwed into said control block through said first housing;

said pump cover including curved bearing surfaces which are provided laterally on each side; and trunnions which function as a fulcrum for swiveling the swash plate of said hydraulic pump are provided pivotally on said curved bearing surfaces.

30. A continuously variable transmission for use on a vehicle, said transmission being provided in a power transmission path which transmits rotational drive power from an output shaft of a prime motor to rear wheels of the vehicle to change the rotational drive power of said prime motor in continuous speed variations, wherein:

said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle;

a hydraulic servo mechanism that swivels the swash plates of said hydraulic pump and said hydraulic motor and a hydraulic control means that performs various hydraulic control operations are placed under said hydraulic continuously variable transmission mechanism;

a control block provided between said hydraulic pump and said hydraulic motor, and said hydraulic closed circuit being provided inside this control block;

a first housing provided on a rear face of the prime motor;

said control block being mounted on said first housing by attaching a front face of said control block to a rear face of said first housing;

said hydraulic pump being mounted in a rear space of said first housing;

a pump cover provided covering said rear space;

a mechanical drive transmission unit comprising a planetary gear train provided in series between the output shaft of the prime motor and an input shaft of said hydraulic continuously variable transmission mechanism; and said mechanical drive transmission unit being an independent unit which is mounted in a space surrounded by first and second casings in front of said pump cover in said first housing.

31. A continuously variable transmission for use on a vehicle, said transmission being provided in a power transmission path which transmits rotational drive power from an output shaft of a prime motor to rear wheels of the vehicle to change the rotational drive power of said prime motor in continuous speed variations, wherein:

said transmission includes a hydraulic continuously variable transmission mechanism that comprises a hydraulic swash plate pump and a hydraulic swash plate motor, which pump and motor are connected with each other through a hydraulic closed circuit and at least one of which is of a variable displacement type, said hydraulic pump being driven by said prime motor for delivering oil through said hydraulic closed circuit to said hydraulic motor, said hydraulic motor being driven by the oil being received for transmitting the rotational drive power to said rear wheels;

said hydraulic continuously variable transmission mechanism has a configuration in which said hydraulic pump, said hydraulic closed circuit and said hydraulic motor are arranged in this listed order in series in a rearward direction from the output shaft of the prime motor in the vehicle;

a hydraulic servo mechanism that swivels the swash plates of said hydraulic pump and said hydraulic motor and a hydraulic control means that performs various hydraulic control operations are placed under said hydraulic continuously variable transmission mechanism;

a control block provided between said hydraulic pump and said hydraulic motor, and said hydraulic closed circuit being provided inside this control block;

a first housing provided on a rear face of the prime motor;

said control block being mounted on said first housing by attaching a front face of said control block to a rear face of said first housing;

said hydraulic pump being mounted in a rear space of said first housing;

a pump cover provided covering said rear space;

a second housing provided on a rear face of said control block, covering said hydraulic motor;

a motor cover provided on a rear face of said second housing.

* * * * *